United States Patent
Chang et al.

(10) Patent No.: US 6,959,076 B2
(45) Date of Patent: Oct. 25, 2005

(54) METHODS AND SYSTEMS FOR PROVIDING TRIGGERLESS INTELLIGENT NETWORK (IN) SCREENING SERVICES BASED ON CALL SETUP MESSAGES

(75) Inventors: James Tjin-Tek Chang, Chapel Hill, NC (US); Thomas Matthew McCann, Morrisville, NC (US); Peter Joseph Marsico, Carrboro, NC (US); Allen Woodward Haley, Jr., McKinney, TX (US); Linda Ann Rushnack, Rohnert Park, CA (US)

(73) Assignee: Tekélec, Calabasas, CA (US)

( * ) Notice: Subject to any disclaimer, the term of this patent is extended or adjusted under 35 U.S.C. 154(b) by 933 days.

(21) Appl. No.: 09/905,543

(22) Filed: Jul. 13, 2001

(65) Prior Publication Data

US 2002/0054674 A1 May 9, 2002

Related U.S. Application Data

(60) Provisional application No. 60/218,204, filed on Jul. 14, 2000.

(51) Int. Cl.[7] .............................................. H04M 7/00
(52) U.S. Cl. ..................................... 379/207.2; 379/230
(58) Field of Search ......................... 376/207.02, 220.01, 376/219, 229, 230, 221.08, 221.01, 201.01

(56) References Cited

U.S. PATENT DOCUMENTS

| | | | |
|---|---|---|---|
| 5,377,186 A | 12/1994 | Wegner et al. | |
| 5,796,806 A | 8/1998 | Birckbichler | |
| 6,094,573 A | 7/2000 | Heinonen et al. | |
| 6,111,946 A | 8/2000 | O'Brien | |
| 6,122,363 A | 9/2000 | Friedlander et al. | |
| 6,125,177 A | 9/2000 | Whittaker | |
| 6,128,379 A | 10/2000 | Smyk | |
| 6,144,663 A | 11/2000 | Hallenstal | |
| 6,144,671 A | 11/2000 | Perinpanathan et al. | |
| 6,148,071 A | 11/2000 | Friedes et al. | |
| 6,167,129 A * | 12/2000 | Fikis et al. | ................. 379/230 |
| 6,385,310 B1 | 5/2002 | Holiday, II | |
| 6,453,019 B1 | 9/2002 | Latter et al. | ................ 379/67.1 |
| 6,498,843 B1 | 12/2002 | Cox | |
| 6,507,649 B1 * | 1/2003 | Tovander | .................... 379/230 |
| 6,611,533 B1 * | 8/2003 | Liao et al. | ................... 370/467 |
| 6,647,113 B2 * | 11/2003 | McCann et al. | ....... 379/221.13 |
| 6,754,330 B1 * | 6/2004 | Yi | .............................. 379/230 |
| 2001/0040957 A1 * | 11/2001 | McCann et al. | |
| 2003/0061391 A1 * | 3/2003 | Yi | |
| 2004/0125814 A1 * | 7/2004 | Christie et al. | |

FOREIGN PATENT DOCUMENTS

| | | | |
|---|---|---|---|
| KR | 394740 | * | 8/2003 |
| KR | 2001039075 | * | 5/2004 |

OTHER PUBLICATIONS

Dalgic et al., "True Number Portability and Advanced Call Screening in a SIP–Based IP Telephony System," IEEE Communications Magazine, p. 96–101, (Jul. 1999).

* cited by examiner

*Primary Examiner*—William J. Deane, Jr.
(74) *Attorney, Agent, or Firm*—Jenkins, Wilson & Taylor, P.A.

(57) ABSTRACT

Method and systems for providing triggerless screening services include a triggerless screening service routing node and a message processing platform. The triggerless screening service routing node identifies call setup messages that require one or more call screening services and diverts the messages to a message processing platform. The message processing platform performs at least one screening action on the call setup messages and modifies the messages to include the type and result of the screening action.

47 Claims, 9 Drawing Sheets

METHODS AND SYSTEMS FOR PROVIDING TRIGGERLESS INTELLIGENT NETWORK (IN) SCREENING SERVICES BASED ON CALL SETUP MESSAGES

PRIORITY APPLICATION INFORMATION

This application claims the benefit of U.S. Provisional Patent Application No. 60/218,204 filed Jul. 14, 2000, the disclosure of which is incorporated herein by reference in its entirety.

TECHNICAL FIELD

The present invention relates generally to triggerless intelligent network screening services. More particularly, the present invention relates to methods and systems for providing triggerless intelligent network screening services based on call setup messages, such as ISDN user part (ISUP) messages or session initiation protocol (SIP) messages.

BACKGROUND ART

The intelligent network (IN) and advanced intelligent network (AIN) were designed to provide additional services to telecommunications network subscribers. Examples of IN and AIN service include 800 number service, calling card verification service, line information database service, etc. Both the AIN and IN architecture moved the databases required to provide these services from the end office switching systems to database nodes, which are referred to in the SS7 network as service control points or SCPs.

Moving IN/AIN service databases to SCPs simplified switching system architecture and allowed services to be modified or updated at the SCPs without modification of each end office switching system served by the SCPs. However, triggers, usually implemented in software, were required to be set at each SSP in order to access IN/AIN services. For example, if a particular subscriber wished to access an AIN service, a trigger would be required to be manually set at the end office serving that subscriber in order to allow the subscriber to access the service. Requiring triggers to be set at end offices places a heavy burden on switching system operators, since these triggers must be provisioned for each subscriber and each service at each end office.

Another problem with providing trigger-based services is that they require database queries, which increase network traffic and call setup time. For example, when a subscriber initiates a call, and that party's end office detects that IN/AIN service is required, the end office launches a transaction capabilities application part (TCAP) query to an SCP. A signal transfer point receives the TCAP query, and routes the TCAP query to the SCP. The SCP formulates a TCAP response and forwards the response back to the end office through the STP. From the time that the query is launched until the response is received, call processing is suspended at the end office, which increases call setup time. In addition, the TCAP query and response messages increase network traffic.

In order to alleviate the problem associated with triggered network services, some triggerless network services have been developed. For example, commonly-assigned, co-pending international patent publication number WO 00/60839, published Oct. 12, 2000, discusses a triggerless number portability solution in which a signal transfer point performs number portability database lookups based on call setup messages received from end offices without requiring triggers at the end offices. While this solution greatly reduces the time required for number portability lookups, there still exists a need for providing other types of triggerless IN-services, such as screening services. As used herein, the phrase "screening services" includes services based on screening one or more parameters in a call setup message. Examples of such screening services include calling number screening, point code screening, credit limit screening, and a variety of other screening services. These screening services have either not been previously provided or have been provided only using triggers or end-office-based network implementations.

In connection with providing triggerless call screening services, there is currently no standard method for notifying a calling or called party end office or other node of the result of a screening action. Unless a screening action is performed by a particular end office, that end office may not know of the result of a screening action that occurred elsewhere in the network. Information regarding the results of a screening action can be important, for example, for notifying a called or calling party of the result of the screening action or for redirecting a call to another location. Accordingly, there exists a long-felt need for methods and systems for communicating call screening results to end offices or other nodes that did not perform the screening action.

DISCLOSURE OF THE INVENTION

According to one aspect, the present invention includes a triggerless screening service screening routing node and a message processing platform for screening call setup messages and communicating call screening information to a receiving end office without requiring end office triggers to invoke screening actions. The triggerless screening service routing node identifies messages that require call screening processing and redirects the messages to a message processing platform. The message processing platform performs one or more call screening operations based on the received call setup messages, modifies the messages to include information to indicate to the results of the call screening action, and forwards the messages to their destinations.

Accordingly, it is an object of the present invention to provide a system and method of providing IN service in a communications network without the need for explicit IN triggers or query messages.

It is another object of the invention to provide a method and system for communicating the results of a call screening action to an end office or other node that did not perform the call screening action.

Some of the objects of the invention having been stated hereinabove, other objects will be evident as the description proceeds, when taken in connection with the accompanying drawings as best described hereinbelow.

DETAILED DESCRIPTION OF THE INVENTION

According to one embodiment, the present invention includes a triggerless screening service routing node and a message processing platform for screening call setup messages and communicating call screening information to a destination node. The triggerless screening service routing node and the message processing platform are described and illustrated herein as collections of modules and databases. It is understood that these modules and databases may be implemented in software residing in memory and executed by one or more general-purpose microprocessors. Alternatively, the modules and databases described herein may be implemented in hardware, such as application-specific integrated circuits (ASICs). Any combination of hardware, software, or hardware and software for providing triggerless IN screening functionality as described herein is intended to be within the scope of the invention.

Exemplary Hardware Platform for Triggerless Screening Service Routing Node

Figure 1:
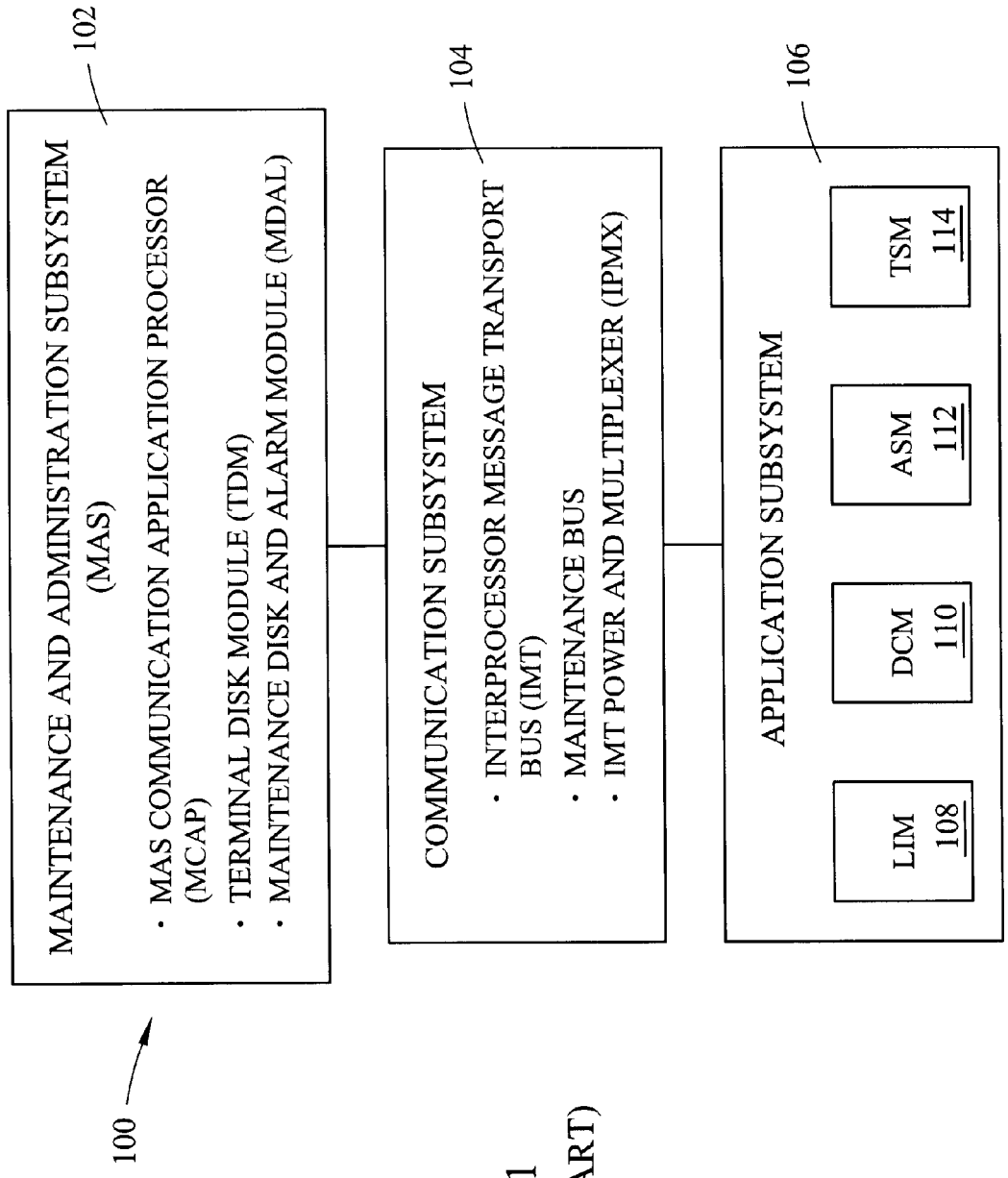
FIG. 1 is a block diagram of an internal architecture of a conventional signaling gateway containing exemplary hardware suitable for use with a triggerless screening service routing node according to embodiments of the present invention.

A triggerless screening service routing node according to an embodiment of the present invention utilize an underlying hardware configuration similar to that of a conventional signal transfer point or SS7/IP gateway. Exemplary commercially-available hardware platforms suitable for use with embodiments of the present invention include the Eagle® signal transfer point or the IP[7]™ Secure Gateway, both available from Tekelec of Calabasas, Calif. FIG. 1 illustrates an exemplary internal architecture of an SS7/IP gateway suitable for use with a triggerless screening service routing node according to an embodiment of the present invention. In FIG. 1, an SS7/IP gateway 100 includes the following subsystems: a maintenance and administration subsystem (MAS) 102, a communication subsystem 104 and an application subsystem 106. MAS 102 provides maintenance communications, initial program loading, peripheral services, alarm processing and system disks. Communication subsystem 104 includes an interprocessor message transport (IMT) bus that is the main communication bus among all subsystems in gateway 100. The IMT bus includes 125 Mbps counter-rotating serial buses.

Application subsystem 106 includes application cards or printed circuit boards capable of communicating with the other cards through the IMT bus. Numerous types of application cards can be included in gateway 100. Exemplary application cards include a link interface module (LIM) 108 that provides SS7 links and X.25 links, a data communication module (DCM) 110 that provides a TCP/IP interface to external nodes, and an application service module (ASM) 112 that provides global title translation and other services. A translation service module (TSM) 114 may also be provided to support triggered local number portability service. The functions of these modules relating to triggerless screening service processing will be described in detail below.

Figure 2:
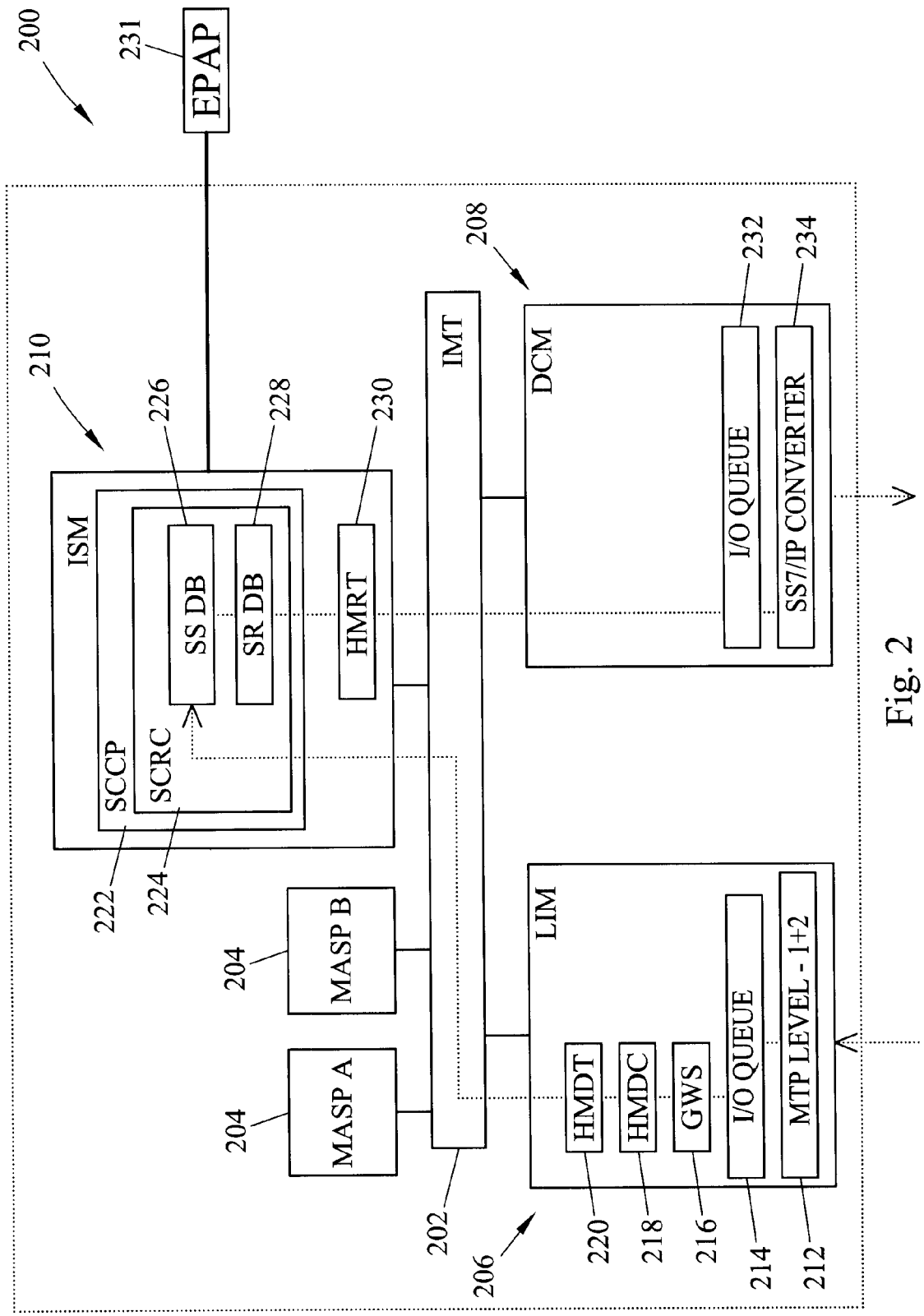
FIG. 2 is a block diagram of an internal architecture of a triggerless screening service routing node according to an embodiment of the present invention.

Exemplary Internal Architecture of Triggerless Screening Service Routing Node FIG. 2 illustrates the internal architecture of a triggerless screening service routing node according to an embodiment of the present invention. In FIG. 2, a triggerless screening service routing node 200 includes a high speed interprocessor message transport communications bus 202. A number of distributed processing modules or cards are coupled to IMT bus 202, including: a pair of maintenance and administration subsystem processors 204, an SS7-capable link interface module 206, a TCP/IP-capable data communication module 208, and an ISDN user part service module (ISM) 210. These modules are physically connected to the IMT bus 202 such that signaling and other types of messages may be routed internally between all active cards or modules. For simplicity of illustration, only a single LIM 206, a single DCM 208, and a single ISM 210 are illustrated in FIG. 2. However, in a distributed processing environment, multiple LIMs 206, DCMs 208, and ISMs 210 may be included within triggerless screening service routing node 200.

MASP pair 204 implement the maintenance and administration subsystem functions described above. As MASPS 204 are not particularly relevant to a discussion of the triggerless screening processing attributes of the present invention, a detailed discussion of their function is not provided herein. MASPS are included for completeness purposes only.

LIM 206 includes a number of component processes including an SS7 MTP level 1 and 2 process 212, an I/O buffer or queue 214, a gateway screening (GWS) process 216, an SS7 MTP level 3 message handling and discrimination (HMDC) process 218, and a message handling and distribution (HMDT) process 220. MTP level 1 and 2 process 212 sends and receives digital data over a particular physical interface. MTP level 1 and 2 process 212 also provides error detection, correction, and sequenced delivery of all SS7 message packets. I/O queue 214 provides temporary buffering of incoming and outgoing signaling message packets.

GWS process 216 is responsible for examining an incoming signaling message and determining whether triggerless screening service is required. In one embodiment, GWS process 216 examines the message transfer part (MTP) origination point code (OPC), destination point code (DPC), and service indicator octet (SIO) parameter values in a received call setup signaling message (e.g., ISUP IAM message) to determine the need for subsequent triggerless screening service processing.

Figure 3:
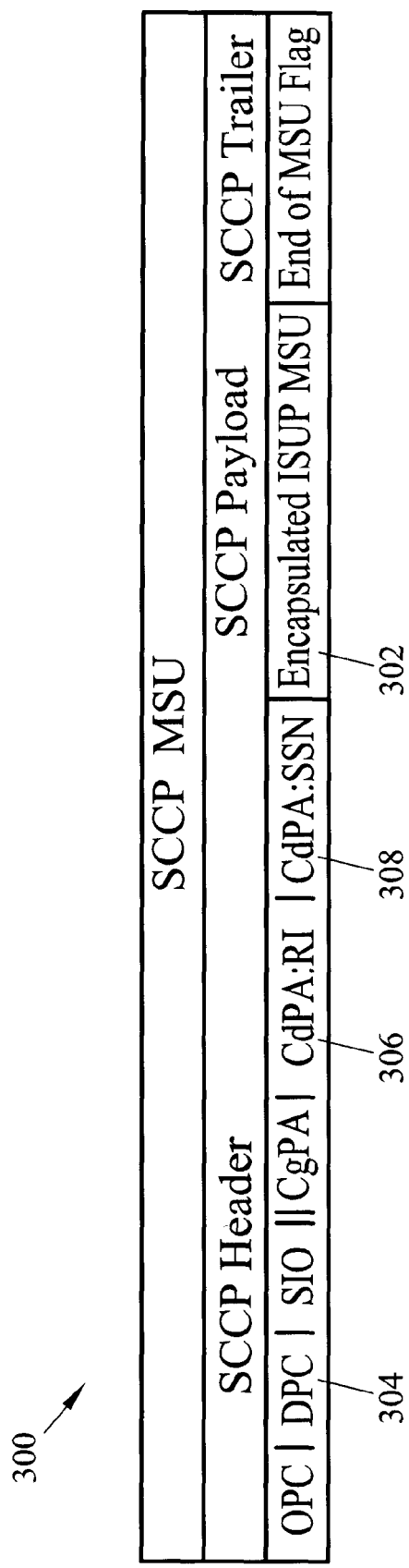
FIG. 3 is a block diagram illustrating an SCCP-encapsulated ISUP signaling message generated by a triggerless screening service routing node according to an embodiment of the present invention.

In the event that a signaling message is identified as requiring ISM service, GWS process 216 encapsulates the incoming signaling message packet within an SS7 signaling connection control part (SCCP) envelope. FIG. 3 is a block diagram illustrating an exemplary SCCP-encapsulated MSU that may be generated by GWS process 216 in response to determining that the message requires triggerless screening service processing. In FIG. 3, an SCCP encapsulating MSU 300 envelops or contains an ISUP MSU 302. Once the ISUP message is encapsulated, the message no longer appears as or is treated as an ISUP message within triggerless screening service routing node 200. Instead, the message is processed internally as an SCCP message. During the encapsulation process, SCCP MSU destination point code (DPC) field 304 is set to the SS7 point code (PC) of the triggerless screening service routing node 200, SCCP MSU Called Party Routing Indicator (CdPA RI) field 306 is set to RT-ON-SSN, and SCCP MSU Called Party Subsystem Number (CdPA SSN) field 308 is set to the ISUP service SSN identifier defined within triggerless screening service routing node 200.

Referring back to FIG. 2, once a received call setup message is identified as requiring screening processing and encapsulated within an SCCP packet, the message is passed to HMDC process 218. HMDC process 218 receives the SCCP-encapsulated signaling message from the lower processing layers and performs a discrimination function to determine whether the message is addressed to triggerless screening service routing node 200 for internal processing or the message should simply be through switched. Because GWS process 216 identified the message as requiring further call screening processing, GWS process 216 inserts the point code of triggerless screening service routing node 200 in the DPC field of the encapsulating SCCP MSU. As a result, HMDC process 218 determines that the message requires further internal processing.

Once HMDC process 218 determines that a message requires internal processing, HMDC process 218 passes the message to HMDT process 220. HMDT process 220 handles the internal routing of SS7 message packets that require additional processing prior to final routing. In this example, HMDT process 220 routes messages requiring triggerless screening service to ISM 210 prior to final routing.

ISM 210 includes databases and control processes necessary to perform the required network address translations to achieve the triggerless ISUP routing functionality implemented by embodiments of the present invention. ISM 210 shown in FIG. 2 includes a signaling connection control part (SCCP) process 222, which receives SCCP-encapsulated message packets from IMT bus 202 and de-capsulates and extracts the original SS7 MSUs prior to triggerless screening service processing. SCCP process 222 further includes a triggerless ISUP screening subsystem controller known as a signaling connection routing controller (SCRC) 224. Responsibilities of the SCRC 224 include directing incoming SS7 message packets to an IN service selector (SS) database 226, using information returned from SS database 226 to perform a lookup in a service routing (SR) database 228, and modifying the message packets to include routing information returned by SR database 228.

SCRC process 224 also examines the called party number for the presence of a carrier selection code (CSC) in an E.164-formatted dialed number parameter included within a received SS7 call setup message, such as an ISDN user part (ISUP) initial address message (IAM). If a CSC is present, SCRC process 224 examines a carrier identification code (CID) contained within the message. A received message may be routed to its original destination without modification if SCRC process 224 determines that the CID belongs to another network, i.e., a network owned by a service provider other than the service provider that owns triggerless screening service routing node 200. Thus, the execution of a service selection lookup in triggerless screening service routing node 200 and subsequent message redirection may be conditional on the particular carrier specified in a received call setup message.

SCRC 224 may also examine various parameters in a received call setup message to determine whether triggerless screening service re-direction is indicated. These parameters may include the message type indicator in service indicator octet (e.g., ISUP IAM, ISUP REL, etc.), called party address (CdPA) or dialed number (DN), calling party address (CgPA), originating point code (OPC), and destination point code (DPC). The processing of these parameters to determine whether to perform a triggerless screening service message redirection will be discussed in more detail below.

SS7 message packets leaving SCRC 224 are received and further processed by a message handling and routing (HMRT) process 230. HMRT process 230 is responsible for the internal routing of SS7 message packets that do not require additional processing by triggerless screening service routing node 200. That is, HMRT process 230 determines to which LIM or DCM card an SS7 message packet should be routed for subsequent outbound transmission. ISM 210 may also be coupled to and serviced by external provisioning and administration platform (EPAP) 231 via an external Ethernet connection. EPAP 231 is responsible for administration and maintenance of the SS and SR databases 226 and 228, respectively.

Once received call signaling messages are routed by HMRT process 230, the messages travel over IMT bus 202 to the module associated with the external signaling link to which the message is routed. In this example, it is assumed that HMRT process 230 MTP-routes the message to DCM 208. DCM 208 includes an I/O queue 232 for temporarily storing messages to be transmitted to or received from an external IP network. An SS7/IP converter process 234 converts outbound messages to IP format and inbound messages to SS7 format. Preferred packet formats for encapsulating SS7 messages in IP packets include the transport adapter layer interface (TALI) for which the source code is available from Tekelec and the stream control transmission protocol (SCTP), as described in IETF Request for Comments 2960: Stream Control Transmission Protocol, October 2000. Once DCM 208 routes the message over the external network, the call setup messages that were identified as requiring additional screening service are received and processed by a message processing platform, which will be described in detail below.

In FIG. 2, SS and SR databases 226 and 228 are co-resident on ISM card 210. These databases may be stored in one or more blocks of high speed random access memory (RAM) located on ISM card 210. Tables 1 and 2 shown below respectively illustrate exemplary contents of databases 226 and 228.

TABLE 1

IN Service Selection Database Fields

| | KEY(s) | | | | | DATA |
|---|---|---|---|---|---|---|
| Type | CgPA:DN | CdPA:DN | DPC | OPC | CID | IN Service |
| IAM | 9194605500 | * | * | * | * | Credit Limit |
| IAM | 9194691300 | * | * | * | * | CallingParty |
| IAM | * | 9194690000 | * | * | 321 | CalledParty |
| IAM | * | * | 1-1-1 | | | |

TABLE 2

IN Service Routing Database Fields

| KEY | ROUTING ADDRESS DATA | | | |
|---|---|---|---|---|
| IN Service | PC | SSN | IP Addr | Port |
| CreditLimit | — | — | 101.000.000.001 | 23 |
| CalledParty_Block | — | 12 | — | — |
| CallingParty_Block | 5-5-5 | 12 | — | — |
| OPC_Block | — | — | 101000.000.001 | 21 |

As indicated by the simplified example presented in Tables 1 and 2, SS database 226 and SR database 228 may each include a single table. It will be appreciated that such a simplistic database structure is presented herein purely for the purposes of illustration. In practice, more efficient database structures would likely be employed which make use of multiple tables and complex binary tree (B-tree) indexing techniques, and, in fact, this consideration applies to all database and table structures presented herein.

As illustrated in Table 1, service selector database 226 includes a number of index or key fields by which the database may be searched. In the illustrated example, these key fields include: message type, calling party number, called party number, originating point code, destination point code, and carrier identification code. It will be appreciated that these fields may be used alone or in combination as a search or lookup key. With particular regard to the calling and called party number fields, it should also be appreciated that these parameters may be comprised of conventional telephone numbers or Internet-service-related-identifiers. Such Internet service identifiers may include email addresses, uniform resource locators (URLs), or Internet protocol (IP) addresses.

In Table 1, an intelligent network service selector is associated with each set of keys. The IN service selector indicates a particular IN service that has been provisioned for that key. For example, in the illustrated table, "CreditLimit" is the IN service selector provisioned for the keys "IAM" and "9194605500." A single IN service or more than one IN service may be provisioned for the same key.

As illustrated in Table 2, IN service database 228 is indexed or keyed by the same IN service selector values that are provisioned in the above-described service selector database. As such, a sample IN service routing record structure includes a service selector key field, a point code field, a subsystem field, an Internet protocol address field, and a port field. It will be appreciated that the point code/subsystem and IP address/port information stored in this table represents a network address corresponding to an IN message processing platform that is adapted to provide the provisioned call screening service in response to receiving the call setup message. Thus, if a lookup in Table 1 results in "CreditLimit" as the screening service, this value is used in Table 2 to determine the network address of the node that provides credit limit screening service. In Table 2, the network address for this node is 101.000.000.001, port 23.

Exemplary Message Processing Platform Architecture

Figure 4:
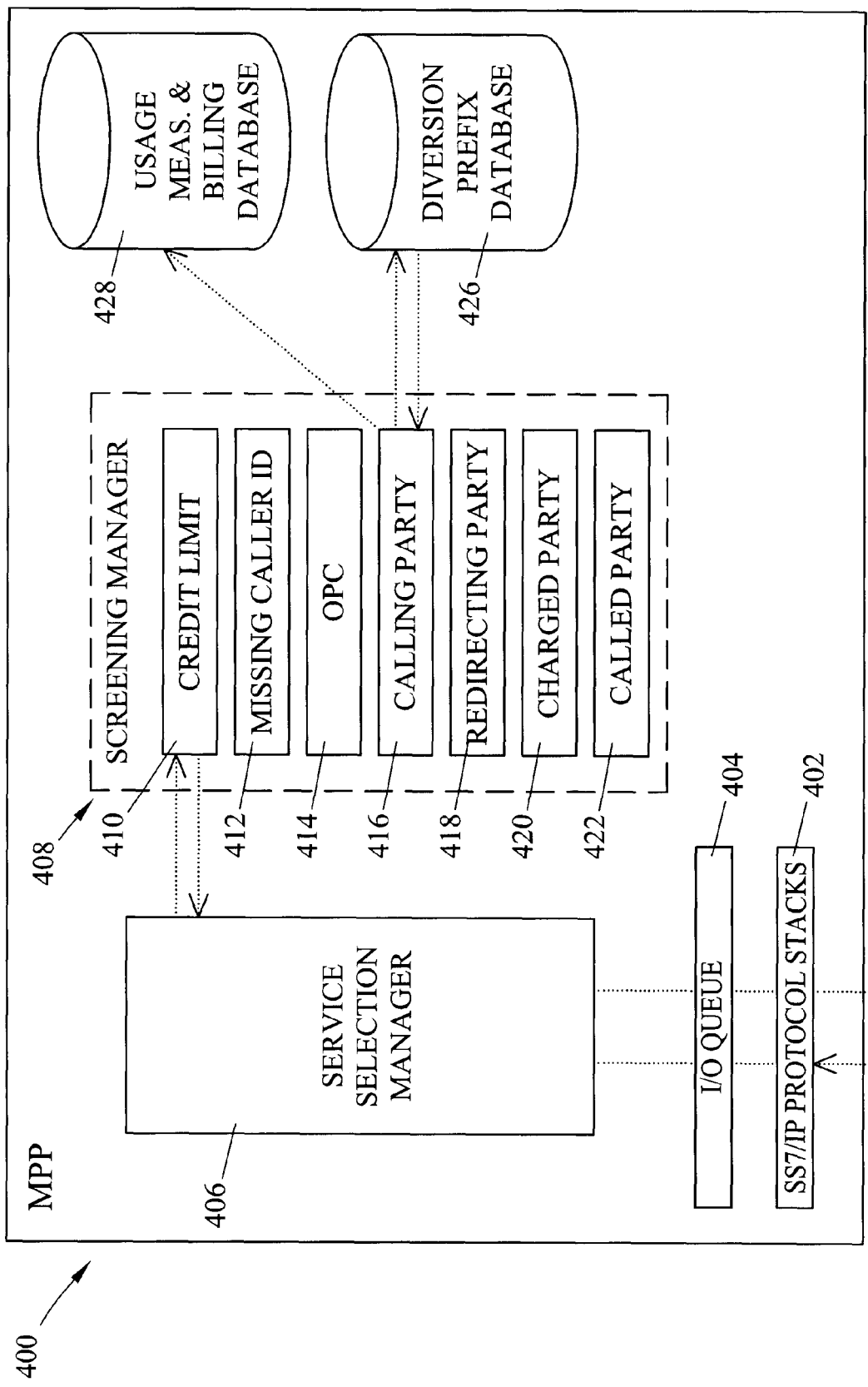
FIG. 4 is a block diagram of an internal architecture of an IN message processing platform (MPP) node according to an embodiment of the present invention.

FIG. 4 is a functional block diagram of an intelligent network message processing platform according to an embodiment of the present invention. In FIG. 4, message processing platform 400 includes IP/SS7 protocol stacks 400 for sending and receiving both SS7 and IP messages. An I/O queue 402 buffers messages before inbound or outbound processing can be performed. MPP 400 further includes a service selection manager 406 and a screening manager 408. In this simplified example, screening manager 408 includes a plurality of screening modules 410–422 for screening call setup messages. In FIG. 4, screening manager 408 includes a CreditLimit screening module 410, a MissingCallerID screening module 412, an OPC screening module 414, a CallingParty screening module 416, a RedirectingParty screening module 418, a ChargedParty screening module 420, and a CalledParty screening module 422. Screening modules 410–422 may screen and modify call setup messages, generate SMS messages and billing records, generate new call setup messages, and respond on behalf of an end office. Each of these functions will be discussed in detail in the examples discussed below.

Table 3 shown below illustrates an exemplary credit limit screening table used by CreditLimit screening module 414.

TABLE 3

Credit Limit Screening Data

| KEY | | INSTRUCTION DATA | |
|---|---|---|---|
| Number | Carrier | Billing | SMS |
| 9194691300 | * | Yes | Yes |
| 9193457012 | 636 | No | No |
| 9193457894 | 221 | Yes | No |
| 919467**** | 811 | Yes | Yes |
| 212******* | 221 | No | Yes |
| 770******* | * | No | No |

In Table 3, the credit limit screening parameters include a calling party telephone number key field as well as a carrier key field. A billing status field indicates whether a billing record should be created for a received message that matches one of the individual keys or key combinations. Table 3 also includes a short message service indicator field. CreditLimit screening module 410 uses the SMS indicator field to determine whether an SMS message should be generated in response receiving a call setup message, e.g., to notify a calling or called party of the results of a call screening action. SMS message generation may be performed in addition to any modifications made to the original received call setup message.

CreditLimit screening module 410 may utilize the data stored in the credit limit screening table to block or redirect a call attempt and generate an SMS message in response to determining that a calling party has exceed their credit limit with a network operator. For example, in response to receiving a call setup message, CreditLimit screening module 410 may perform a lookup in the credit limit screening table to determine whether the calling party has exceeded his or her credit limit with a particular carrier. In response to determining that a calling party has exceeded his or her credit limit, CreditLimit screening module 410 may block or redirect the call CreditLimit screening module 410 may also send an SMS message to the calling party or to a short message service center servicing the calling party. The SMS message may indicate that the call was blocked due to a credit problem of the calling party.

Table 4 shown below illustrates exemplary parameters utilized by Missing Caller ID screening module 412.

TABLE 4

Missing Caller ID Screening Data

| KEY | | BILLING DATA |
| --- | --- | --- |
| CdPA Number | Carrier | Billing |
| 9194691300 | 221 | Yes |
| 9193457312 | 533 | No |
| 9194457894 | 223 | Yes |
| 919469**** | 841 | Yes |
| 212******* | 221 | No |
| 770******* | * | No |

In the illustrated example, Table 4 includes a called party telephone number key field as a carrier key field. A billing status field indicates whether a billing record should be created for a received message that matches one of the individual keys or the key combination.

Missing CallerID module 412 may utilize call screening data, such as that illustrated in Table 4, to block or redirect a call attempt in the event that calling party identification information is missing from a received call setup message. For example, if a particular subscriber does not wish to receive calls from parties that block their caller ID, the subscriber's telephone number may be stored in a table accessible by MissingCallerID module 412. When MissingCallerID module 412 receives a message, MissingCallerID module 412 checks the table to determine whether the called party does not wish to receive caller-ID-blocked calls. In response to determining that the called party does not wish to receive calls that lack caller ID information, MissingCallerID module 412 may block or redirect the call setup message associated with the particular call. It will be appreciated that such a call blocking or redirection service can be activated for blocks or ranges of received call setup messages that are missing calling party identification information through the use of wildcard designators (e.g., "*"), such as those illustrated in Table 4. In all of the tables described herein, "*" denotes a wildcard.

Table 5 shown below illustrates exemplary OPC screening parameters used by OPC screening module 514.

TABLE 5

OPC Screening Data

| KEY | | BILLING DATA |
| --- | --- | --- |
| OPC | Carrier | Billing |
| 1-1-1 | 221 | Yes |
| 1-1-2 | 636 | No |
| 1-1-3 | 221 | Yes |
| 1-2-* | 811 | Yes |
| 2-1-1 | 221 | No |
| 3-*-* | * | No |

In this example, the OPC screening parameters include an OPC key field and a carrier identification code key field. As with the previous examples, each table entry also includes a billing status indicator that indicates whether or not to generate a billing message in response to a screened call signaling message.

OPC screening module 414 uses the data illustrated in Table 5 to block or redirect a call attempt in the event that a call setup message originates from a particular switch owned by a particular carrier. For example, OPC screening module 414 may perform a lookup in Table 5 using the OPC extracted from a received ISUP message. If the lookup indicates that the call should be blocked, then OPC screening module 414 either blocks or redirects the call.

Table 6 shown below illustrates exemplary calling party screening parameters used by CallingParty screening module 416.

TABLE 6

Calling Party Screening Data

| KEY | | BILLING DATA | |
| --- | --- | --- | --- |
| CgPA Number | Carrier | Billing | SMS |
| 9194691300 | 221 | Yes | Yes |
| 9193657712 | 636 | No | Yes |
| 9193217894 | 221 | Yes | No |
| 9194828888 | 811 | Yes | No |
| 212******* | 221 | No | Yes |
| 770******* | * | No | No |

The calling party screening parameters illustrated in Table 6 include a calling party telephone number key field and a carrier identification code key field. Each entry in Table 6 also includes an SMS indicator and a billing status indicator to indicate whether to send an SMS message and whether to generate billing information for a received call setup message.

CallingParty screening module 416 uses the data stored in Table 6 to block or redirect a call attempt in the event that a call setup message is received that is associated with particular calling party. For example, calling party screening module 416 may perform a lookup in Table 6 based on the calling party address in a received signaling message. If the address matches one of the entries in the table, then CallingParty screening module 416 may block or redirect the call and send an SMS message to the calling party. The asterisks in Table 6 indicate that call screening can be performed based on ranges of calling party numbers.

Table 7 shown below illustrates exemplary redirecting number screening data that may be used by RedirectingNumber screening module 418.

TABLE 7

Redirecting Number Screening Data

| KEY | | BILLING DATA |
| --- | --- | --- |
| Redirecting Number | Carrier | Billing |
| 9194691300 | 221 | Yes |
| 9193657712 | 636 | No |
| 9193217894 | 221 | Yes |
| 9194828888 | 811 | Yes |
| 212******* | 221 | No |
| 770******* | * | No |

In the illustrated example, Table 7 includes a redirecting number key field and a carrier identification code key field. Each entry also includes a billing data field that indicates whether to generate a billing record.

In operation, RedirectingNumber screening module 418 uses the data in Table 7 block or redirect a call attempt in the event that a call setup message is received from a particular redirecting number. For example, when directing number screening module 418 receives a call setup message, RedirectingNumber screening module 418 may extract the redirecting number from the message and perform a lookup in a table similar to Table 7 based on the redirecting number. If the redirecting number from the message matches one of the entries, RedirectingNumber screening module 418 may block or screen the call based on the content of the entry. Redirecting number screening module 418 may also generate a billing record if the billing indicator for that particular entry indicates that such a record should be generated.

Table 8 shown below contains exemplary data used by ChargedParty screening module 420.

TABLE 8

Charged Party Screening Data

| KEY | | BILLING DATA |
|---|---|---|
| Number | Carrier | Billing |
| 9194691300 | 221 | Yes |
| 9193657712 | 636 | No |
| 9193217894 | 221 | Yes |
| 9194828888 | 811 | Yes |
| 212******* | 221 | No |
| 770******* | * | No |

In this example, a charged party screening table includes a telephone number key field for storing charged party numbers and a carrier identification code key field for storing carrier identifiers. As with the previous examples, each entry in the table may include a billing indicator for indicating whether a billing record should be generated for the call.

ChargedParty screening module 420 uses the data in Table 8 to block or redirect a call attempt in the event that the party that is paying for the call is in the list of prohibited callers. For example, when ChargedParty screening module 420 receives a call setup message, ChargedParty screening module 420 extracts the telephone number corresponding to the charged party from the call setup message and performs a lookup in Table 8 based on the extracted number. In response to locating a matching entry in Table 8, ChargedParty screening module 420 may block or redirect the call.

Table 9 shown below illustrates exemplary CalledParty screening data used by CalledParty screening module 422.

TABLE 9

Called Party Screening Data

| KEY | | BILLING DATA | |
|---|---|---|---|
| CgPA Number | Carrier | Billing | SMS |
| 9194691300 | 221 | Yes | Yes |
| 9193657712 | 636 | No | Yes |
| 9193217894 | 221 | Yes | No |
| 9194828888 | 811 | Yes | No |
| 212******* | 221 | No | Yes |
| 770******* | * | No | No |

In this example, the called party screening table includes a called party telephone number key field for screening called party numbers in received call signaling messages and a carrier identification code key field for storing a carrier identifier. Each entry may also include a billing indicator for indicating whether a billing record is required to be generated for the call.

In operation, CalledParty screening module 422 utilizes data in Table 9 to block or redirect a call attempt to a prohibited called party. For example, when CalledParty screening module 422 receives a call setup message, CalledParty screening module 422 extracts the called party ID from the message and performs a lookup in Table 9 based on the called party ID. In response to locating a matching entry, CalledParty screening module 422 may block or redirect the call and possibly generate a billing record, depending on the content of the billing record field.

The present invention is not limited to the IN screening service described above. Numerous other types of IN or IN-like services may be provided by MPP 500 in the same manner as the IN screening services described above. Each of the screening modules may also generate a second, new message in response to screening a call setup message. Such a new message may be another SS7 call setup message, a call setup message of a different protocol (e.g., session initiation protocol), or a non-call setup message (e.g., short message service, transaction capabilities application part message, mobile application part message, etc.).

Returning to FIG. 4, modules 408-422 communicate with a diversion prefix (DP) database 426 and a usage measurements and billing (UMB) database 428 to obtain diversion prefixes and billing information for received call setup messages. Diversion prefix database 426 stores information used to modify and divert a call setup message in response to determining that the message satisfies (or fails, depending upon the particular implementation) one or more of the provisioned IN screening services. The information obtained from diversion prefix database 426 may also indicate to the receiving node the results and type of call screening action performed. Usage measurements and billing database 428 stores exemplary data that may be used to generate billing records. Exemplary data that may be stored in databases 426 and 428 will now be discussed in more detail.

Table 10 shown below illustrates an exemplary diversion prefix parameters.

TABLE 10

Diversion Prefix Data

| KEY | | | | DIVERSION PREFIX |
|---|---|---|---|---|
| Service | Number | OPC | Carrier | Prefix |
| CreditLimit | * | * | * | 867 |
| MissingcallerID | * | * | * | 745 |
| CallingParty | * | * | * | 201 |
| OPC | * | * | * | 978 |
| CalledParty | * | * | * | 351 |
| RedirectingParty | * | * | * | 204 |
| ChargedParty | * | * | * | 512 |

As illustrated above, each entry in the diversion prefix table includes a service type key field and an associated diversion prefix that is used to modify a screened call setup and cause the message to be redirected or diverted from its originally intended route. Such call setup message diversion may be used to block or redirect a call attempt, and/or to invoke an interactive voice response (IVR) node. IVR nodes are typically deployed in communication networks to play pre-recorded messages to a calling party.

In the case of a call block initiated by MPP 200, an IVR node may be engaged to play a pre-recorded message that informs the calling party of the reason that the call was blocked, e.g., due to the called party's credit standing with the telecommunications service provider.

Usage measurements and billing database 428 includes a table of usage metrics and billing information related to the screening and processing of call setup messages by MPP 200. In one embodiment, usage measurements and billing database 426 maintains call detail records (CDRs) of screened messages. Table 11 shown below illustrates an exemplary usage measurements and billing data for screened messages.

TABLE 11

Usage Measurements and Billing Data

| KEY | | | BILLING RECORD DATA | |
|---|---|---|---|---|
| Date | Time | Service | Number | Carrier |
| 12/01/2000 | 13:01:24 | CallingParty | 9194591300 | 221 |
| 12/01/2000 | 13:01:26 | CalledParty | 9193457012 | 616 |
| 12/01/2000 | 13:01:34 | OPC | 9193457894 | 221 |

As illustrated above, each entry in the usage measurements and billing table includes date, time, and service type key fields. Each entry may also include a phone number field that contains the phone number or identifier (e.g., email address, URL, etc.) used in the screening process. Each entry may further include a carrier ID field for storing the carrier ID associated with the screened message. Although not illustrated in Table 10, usage measurements and billing database 428 may also store peg count information.

Figure 5A:
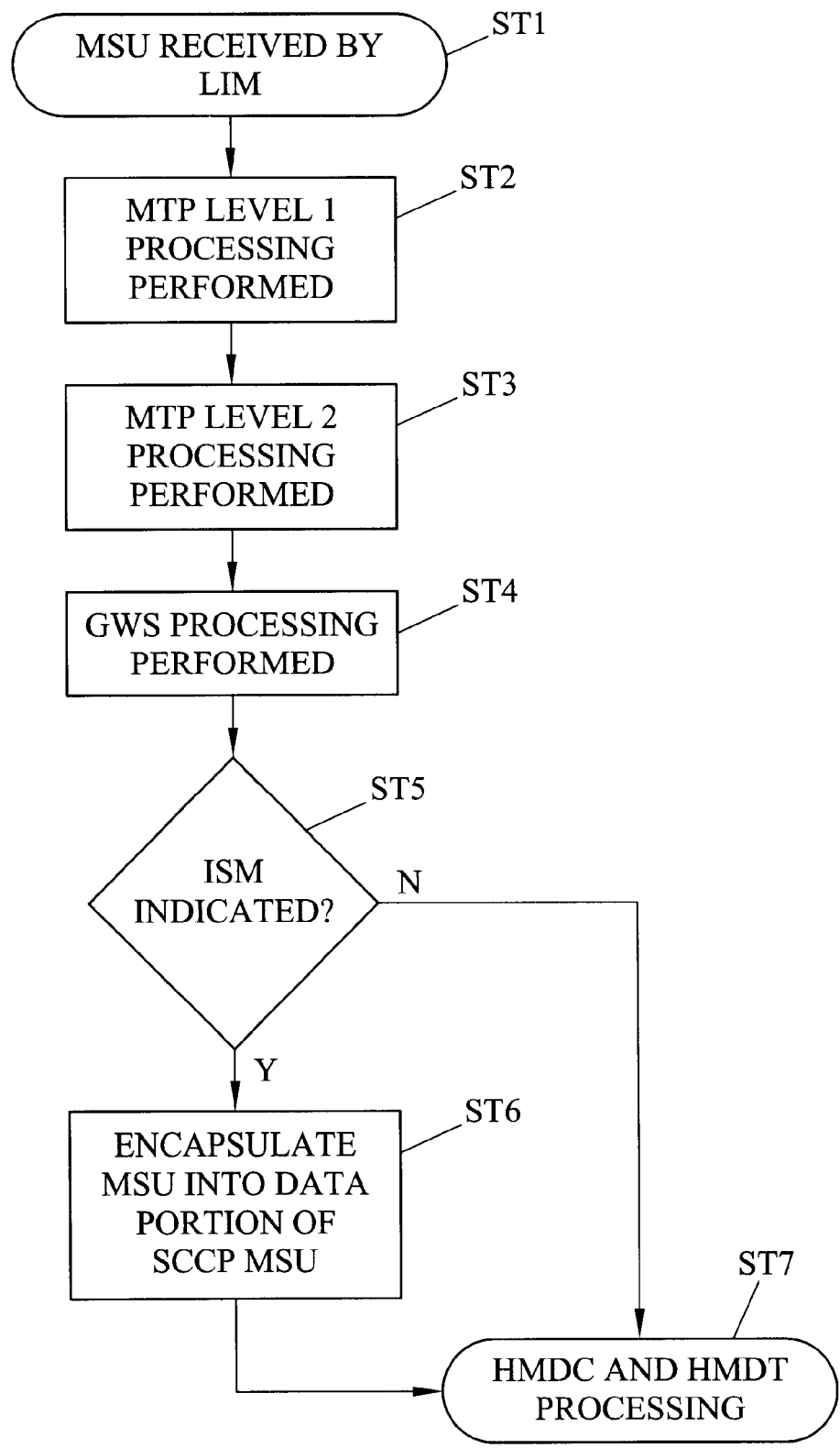
FIGS. 5A and 5B are flow charts illustrating processing of a received ISUP message by a triggerless screening service routing node according to an embodiment of the present invention.
Figure 5B:
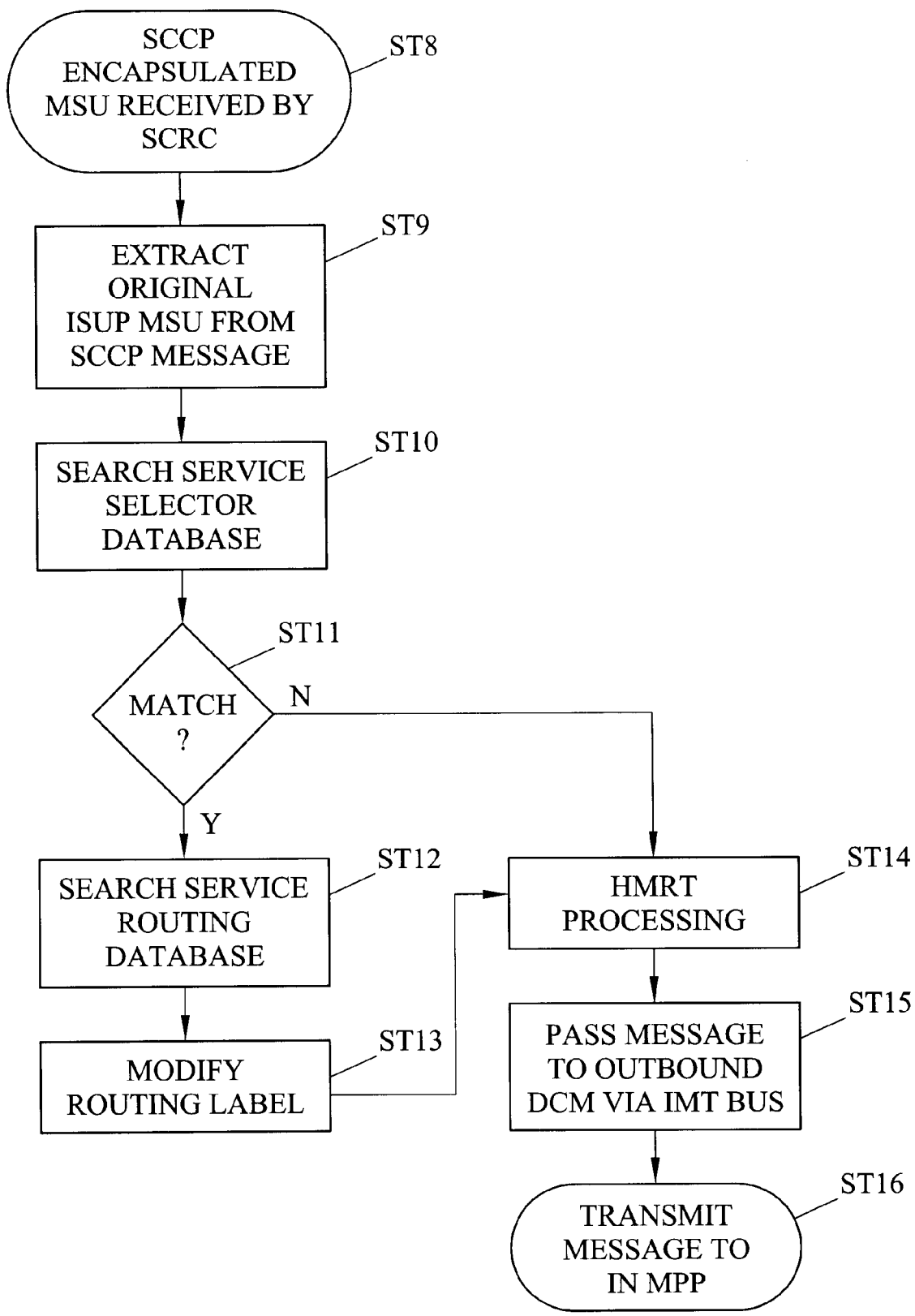

Exemplary Internal Message Processing by Triggerless Screening Service Routing Node FIGS. 5A and 5B are a flow chart illustrating message processing performed by triggerless screening service routing node 200 illustrated in FIG. 3. Referring to FIG. 5A, in step ST1, an incoming ISUP IAM message is received at inbound LIM module 206. In steps ST2 and ST3, the incoming ISUP IAM message is received and processed by the MTP Level 1 and 2 process 212. As stated above, MTP level 1 and 2 processing includes error detection, error correction, message sequencing, etc. When MTP Level 1 and 2 processing is completed, the IAM message is temporarily buffered in I/O queue 214 before being passed up the stack to gateway screening process 216. In step ST4, GWS process 216 examines the ISUP IAM message and determines not only whether the message is to be allowed into the switch for further processing, but also whether further triggerless screening service processing of the message is required. In this example, GWS process 216 examines the incoming ISUP IAM message and determines that the message is permitted to enter the switch. In step ST5, GWS process 216 examines the originating point code (OPC) and service indicator (SI) fields contained in the MTP routing layer of the message and determines that the message requires additional triggerless screening service processing by ISM 210.

After verifying that the received message is an ISUP message signaling unit (MSU), in step ST6, GWS process 216 encapsulates the ISUP MSU within an SCCP envelope. Such SCCP encapsulation may be achieved by adding SCCP message leading and trailing bit sequences to the base bit sequence of the ISUP IAM MSU, as illustrated in FIG. 3. Thus, an SCCP encapsulating MSU is created which envelops or contains an ISUP MSU.

After the ISUP message is encapsulated in the SCCP envelope, the message is no longer treated as an ISUP IAM message within triggerless screening service routing node 200, but is instead processed internally as an SCCP message. As mentioned previously, during the encapsulation process, the SCCP MSU destination point code (DPC) field is set to the point code of triggerless screening service routing node 200, the SCCP MSU called party routing indicator (CdPA RI) field is set to subsystem number (SSN), and the SCCP MSU called party subsystem number (CdPA SSN) field is set to the subsystem number corresponding to ISM 210. It should also be appreciated that failure of the incoming ISUP MSU to meet the criteria specified in step ST5 causes the original, non-encapsulated MSU to be routed directly to HMDC process 316 where normal MSU routing is resumed.

However, in the case where an incoming MSU satisfies the step ST5 criteria (i.e., ISUP MSU from a designated OPC), SCCP encapsulation of the MSU occurs and the resulting encapsulated MSU is directed to HMDC process 218, where the message is identified as requiring further internal processing (ST7). HMDC process 218 examines the message packet and determines that the DPC of the packet is the PC of triggerless screening service routing node 200. Consequently, further processing of the SCCP MSU within triggerless screening service routing node 200 is assumed to be necessary, and the packet is passed to the HMDT process 220. HMDT process 220 examines the service indicator (SI) field of the message, which indicates that encapsulating packet is of an SCCP type. As such, HMDT process 218 places encapsulating SCCP MSU 370 on high speed IMT bus 202 for transport to ISM 210 and subsequent triggerless screening service processing.

Referring now to FIG. 5B, in step ST8, the encapsulating SCCP MSU is received and verified by SCCP process 224. The SCCP message is next passed to SCRC process 226, where it is verified that the SCCP MSU contains an encapsulated ISUP MSU. Such verification processing may include the verification of the pointers and field lengths associated with the ISUP message. In the event that the contents of the encapsulating packet are determined to be something other than an ISUP signaling message, the packet is passed to HMRT process 230 for outbound routing or possibly further processing at another card on the IMT bus 202. Following a positive ISUP verification, the original ISUP MSU is extracted by removing and discarding the SCCP wrapper (ST9).

Once the ISUP MSU is extracted, in step ST10, a lookup is performed in service selector database 226 using information extracted and/or inferred from the original ISUP MSU. Database 226 may be searched by comparing parameters extracted from the ISUP message to at least one of the keys contained in SS database 226 (e.g., message type, calling party number, called party number, OPC, DPC, CID, etc.). In step ST11, ISM 210 determines whether a matching entry has been located. If a matching entry is found, in step ST12, a lookup is performed in service routing database 228. Database 228 may be searched by comparing parameters extracted from the message to the IN service information stored in database 228.

The resulting matching entry in IN service routing database 228 yields routing instructions that are to be applied to the received ISUP MSU. These routing instructions may include an SS7 point code and subsystem or an Internet protocol (IP) address and port. Once the routing address is located, the routing label of the original ISUP MSU is modified to reflect the new routing instructions (ST13), and the message is passed to HMRT process 350 (ST14) for subsequent routing to the outbound DCM 208 (ST15). In this particular example, DCM 208 encapsulates the modified ISUP MSU in a transport adapter layer interface packet for transmission via a TCP/IP connection or socket to an associated IN message processing platform (MPP), as indicated in step ST16. Information identifying the required IN service or services may be included in the TALI component of the encapsulated ISUP packet. Accordingly, a triggerless screening service routing node of the present invention is adapted to intercept and redirect a call setup message to a MPP for subsequent IN-type processing.

Exemplary Internal Message Processing by MPP 400

Figure 6:
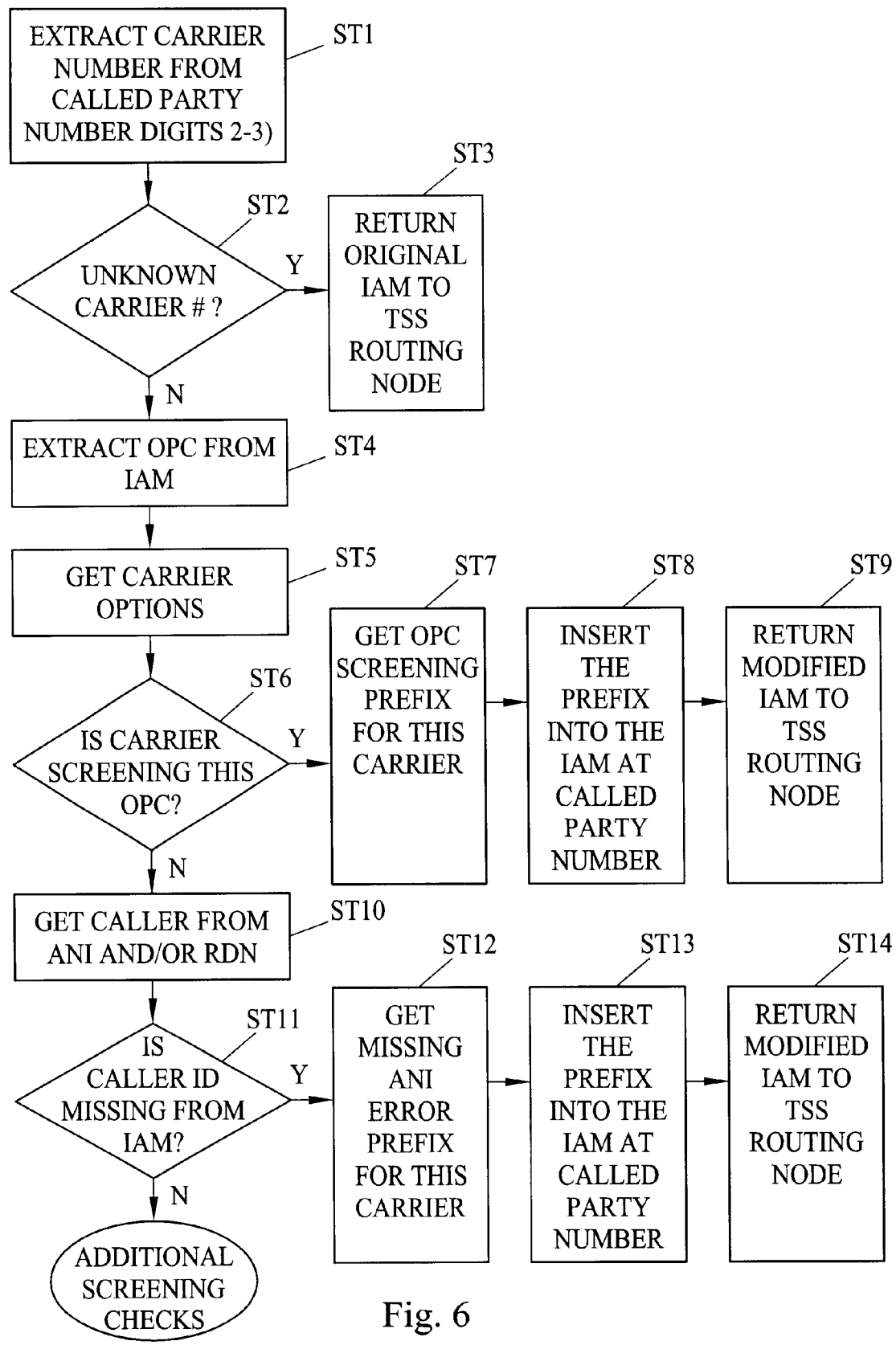
FIG. 6 is a flow chart illustrating IN screening service processing of an ISUP message by an IN MPP node according to an embodiment of the present invention.

FIG. 6 is a flow chart illustrating exemplary steps performed by MPP 400 in providing triggerless IN screening service according to an embodiment of the present invention. Referring to FIG. 6, in step ST1, MPP 400 extracts the carrier number from the called party digits in a received ISUP message. The purpose of extracting the carrier number is to determine whether the owner of MPP 400 has a service agreement to provide triggerless IN services for the particular carrier identified by the carrier ID. Accordingly, in step ST2, MPP 400 determines whether the carrier number is unknown. If the carrier number is unknown, in step ST3, MPP 400 returns the original IAM message to triggerless screening service routing node 200, which forwards the message to the called party end office.

In step ST4, if the carrier number is not unknown, i.e., if the particular carrier has a service agreement with the owner of MPP 400, MPP 400 extracts the originating point code from the IAM message. The originating point code indicates a particular switching system within the carrier's network from which the IAM message originated. In step ST5, MPP 400 extracts screening options for the particular carrier. Such screening options may include credit limit screening, missing caller ID screening, OPC screening, calling party screening, redirecting party screening, charged party screening, or called party screening. In this example, it is assumed that OPC and calling party screening are provisioned for this particular carrier. Accordingly, in step ST6, MPP 400 determines whether the carrier is screening this particular OPC.

According to an important aspect of the invention, in step ST7, if the carrier is screening this particular OPC, MPP 400 obtains an OPC screening identifier for the particular carrier. The identifier indicates which screening criteria are matched by MPP 400. In step ST8, MPP 400 inserts the identifier into the IAM message. The screening identifier may be inserted as a prefix in the called party number field of the IAM message. The identifier will be used by the receiving end office to identify the type of screening action performed by MPP 400 and the result of the screening action. The receiving end office may use the identifier to take appropriate action, such as contacting an IVR node. In step ST9, MPP 400 returns the modified IAM message to triggerless screening service routing node 200. Triggerless screening service routing node 200 forwards the modified message to the destination end office.

Inserting an identifier in an IAM message at a message processing platform that is separate from an originating end office eliminates the need for end office triggered IN services. Traditionally, such services have required that each end office determine whether a dialed number requires IN service, formulate a TCAP query to a service control point to determine the type of service required, receive a TCAP response from the service control point, and then provide the appropriate IN service. The trigger for the IN service must be provisioned for each number requiring IN service at each end office. Thus, associating such services with subscriber numbers requires that each end office by provisioned to recognize numbers requiring IN services. Provisioning all such end offices is labor intensive and often impossible when the end offices are owned by different carriers. Triggerless screening service routing node 200 and MPP 400 according to embodiments of the present invention eliminate this problem by centralizing the numbers that require IN services and inserting a prefix that a particular carrier can use to recognize an IN service required for a call.

In addition to OPC screening services, MPP 400 may perform other screening operations, such as calling party screening. Accordingly, in step ST10 in FIG. 6, MPP 400 extracts the calling party number from the IAM message. In step ST11, MPP 400 determines whether the calling party number is missing from the IAM message, such as when the calling party blocks such information. In step ST12, MPP 400 extracts a missing automatic number identification error identifier for the particular carrier. In step ST13, MPP 400 inserts the identifier into the IAM message. In a preferred embodiment of the invention, the message is inserted as a prefix in the called party number field of the IAM message. In step ST14, the IAM message is returned to triggerless screening service routing node 200, which forwards the message to its intended destination.

As indicated in FIG. 6, additional screening checks may be performed. Accordingly, by inserting an identifier or identifiers into a received IAM message that indicate the type of screening and the outcome of the screening performed by MPP 400, MPP 400 according to an embodiment of the present invention reduces both provisioning and processing requirements at end office switching systems.

Message Processing Platform Internal Message Flow

Referring back to FIG. 4, the dotted line illustrates an exemplary message flow path through message processing platform 400 according to an embodiment of the present invention. In the example in FIG. 4, it is assumed that MPP 400 receives an IP-encapsulated ISUP packet via a TCP/IP socket connection. SS7/IP protocol stacks 402 receive the packet and extract the ISUP MSU payload contained therein. The extracted ISUP MSU is then passed via I/O queue 404 to service selection manager 406. Service selection manager 406 examines destination address information (e.g., DPC and SSN) contained within the ISUP message to determine the particular IN service or services that are required.

It will be further appreciated that such destination address information may be used not only to identify a particular IN service, but also to specify a particular screening variation. For example, a particular point code and subsystem in a received ISUP message may indicate that the received message requires credit limit screening. Once, service selection manager identifies the type of screening service(s) required, service selection manager 406 passes the message to CreditLimit screening module 410 of screening module 408. CreditLimit screening module 410 examines the ISUP message and extracts calling party number information from the message. For the purposes of this example, it is assumed that the calling party number is 919-469-1300. CreditLimit screening module 408 uses the extracted calling party number to perform a lookup in the credit limit screening table (Table 3). As illustrated in Table 3, a search of the number field for 919-469-1300 results in the location of a match with the first entry in the credit limit screening table. This matching entry in the table also indicates that a usage measurements/billing record should be generated. Consequently, a copy of the ISUP MSU or a portion of the information contained therein is passed to usage measurements and billing (UMB) database 428, where an entry is inserted in a UMB table, as indicated in Table 11. Such UMB data may be used at a later time to generate invoices for the use of MPP resources.

CreditLimit screening module 410 also communicates with diversion prefix database 426 to obtain a prefix to be used for diversion or redirection of the ISUP MSU. CreditLimit screening module 410 appends the diversion prefix to the called party number contained in the original ISUP MSU. It will be appreciated that in the particular example discussed herein, only the IN service type is required to obtain diversion or redirection instructions for the ISUP MSU, as all other specifying parameters are wildcards in diversion prefix database 426.

The terms "diversion prefix" and "screening identifier" are used interchangeably herein. Both phrases are intended to refer to a parameter that is inserted in the call setup message that identifies the type and result of a screening action to a destination node. The destination node may use this parameter or parameters to take appropriate action, such as blocking or redirecting a call.

Referring to Table 10 set forth above, a lookup based on the number 919-469-1300 results in a diversion prefix value of 867, which indicates that credit limit screening was performed and that the message failed the credit limit screening process. CreditLimit screening module 410 obtains the diversion prefix value from diversion prefix database 426 and appends this information to the called party number contained in the original ISUP MSU. CreditLimit screening module 410 may also add or modify several additional parameters contained within the ISUP MSU, including: an original called number (OCN) parameter, a redirecting number (RN) parameter, a redirection information (RI) parameter, and a forward call indicator (FCI) parameter. The OCN parameter is used to maintain a copy of the original called number within the ISUP MSU. The RN parameter is used to track the "exchange" that performed the MSU diversion. The RI parameter is used to count the total number of times the call has been redirected along with the reason for each redirection, and the FCI is modified to a value that indicates "ISUP preferred all the way" so that the call diversion/redirection information is not lost. It should be appreciated that other parameters may be modified or added to an ISUP MSU, depending upon the particular IN service processing that is involved.

In any event, the modified ISUP MSU is then passed to SS7/IP protocol stack 402 for encapsulation within a TALI packet. The IP-encapsulated, modified ISUP MSU is then transmitted back to triggerless screening service routing node 200 for subsequent routing to a final destination. Again, it will be appreciated that TALI encapsulation is not an essential element or requirement of the present invention but instead simply facilitates the transmission of ISUP MSUs via a TCP/IP socket connection as opposed to a conventional SS7 /MTP type signaling link.

Call Screening Examples

Figure 7:
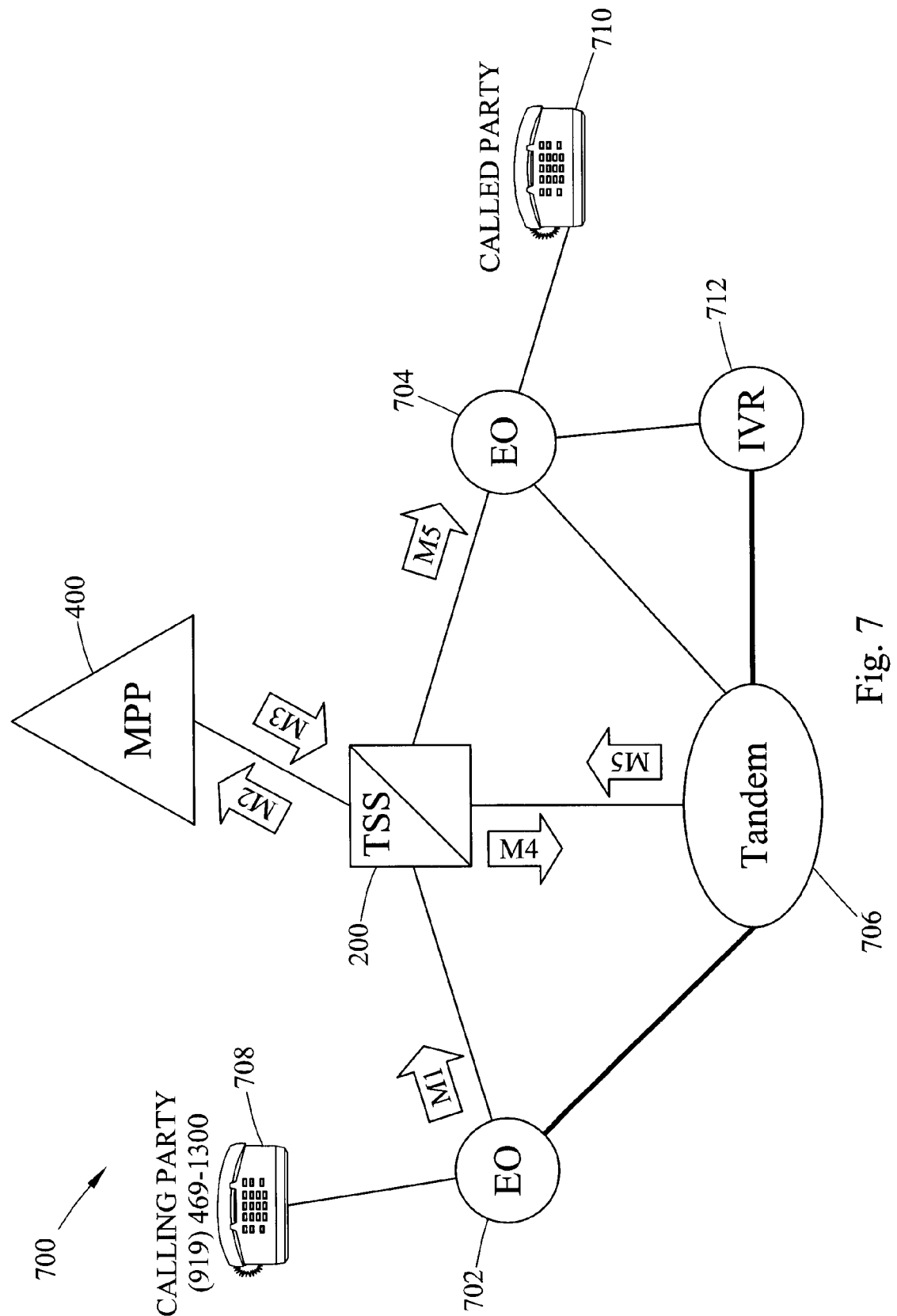
FIG. 7 is a network diagram illustrating signaling message flow associated with the operation of a triggerless IN screening system according to an embodiment of the present invention.

FIG. 7 illustrates an exemplary communication network including network elements and message flows of a system for providing triggerless IN services according to an embodiment of the present invention. In FIG. 7, network 700 includes triggerless screening service routing node 200 and MPP 400 described above. Communications network 700 also includes a number of discrete network elements and communication terminals, including an originating end office 702, a second EO 704, a tandem office 706, a calling party 708, and a called party 710. An interactive voice response node 712 receives digits from and plays pre-recorded messages to a calling party. In the case of a call block initiated by a system for providing triggerless IN services according to embodiments of the present invention, such an IVR node may be engaged to play a pre-recorded message that informs the calling party of their poor credit standing, or similar type information.

In this example, it is assumed that CallingParty blocking service is desired and has consequently been provisioned in MPP 400 by the owner/operator of network 700. When calling party 708 attempts to place a call to called party 710, end office 702 generates an ISUP initial address message (IAM) M1. Message M1 is transmitted to triggerless screening service routing node 200, where GWS process 216 examines the MSU and determines that further internal processing is required by ISM module 210. ISM module 210 processes the MSU and determines that further processing is required by MPP node 400. Again, such a determination is made through a search of the service selector and service routing databases based on the calling party number (i.e., 919 469-1300).

Once the message is identified as requiring further processing by MPP 400, the message M1 is TALI-encapsulated and forwarded to MPP node 400 for subsequent processing as message M2. MPP node 400 receives TALI-encapsulated message M2 and extracts the ISUP IAM MSU contents. The ISUP IAM MSU is eventually processed by CallingParty screening module 416. As generally indicated in Table 6, the calling party has been identified as blocked party. That is, calls from this party are not to be allowed in the network 700. Furthermore, as indicated by the billing identifier for the matching entry in Table 6, a record of this transaction is required. Consequently, a billing record is generated in UMB database 428 to track this IN service transaction and a diversion prefix "201" is obtained from DP database 428 is included in the ISUP IAM MSU. Other parameters within the original ISUP IAM MSU may also be changed or added to complete the MSU modification process, as discussed previously.

Table 12 shown below includes a partial listing of the parameter contents of the original (M2) and modified (M3) ISUP IAM MSU.

TABLE 12

Original and Modified ISUP Message Contents

| PARAMETER | M2 | M3 |
| --- | --- | --- |
| CGPA Number | 9194691300 | 9194691300 |
| CDPA Number | 9193803815 | DP + 9193803816 |

In Table 12, the leftmost column indicates the parameter names for some of the parameters in an ISUP MSU. The central column illustrates the parameters of the message M2. The rightmost column illustrates the parameters of the message M3 after processing by MPP 400. It can be seen by comparing the parameters of messages M2 and M3 that MPP 400 has inserted a screening type identifier, which is symbolically illustrated by "DP" in message M3, that can be used by the receiving end office to determine the type and outcome of the screening performed by MPP 400 and to take appropriate action. In addition to or instead of adding the screening type identifier to the called party number, MPP 400 may modify the called party number. In example illustrated in Table 12, the called party number has been changed from 9193803815 to 9193803816. The new called party number may be used by the receiving end office to direct the call to an operator or customer service agent who will explain the result of the screening action to the caller. If the original called party number is modified, MPP 400 may also store the original called party number in the call setup message.

Referring back to FIG. 7, once message M3 is modified to include the screening service identifier, the message is TALI-encapsulated and transmitted back to triggerless screening service routing node 200 for routing. In this particular example, the modified ISUP IAM MSU is extracted from message M3 at the triggerless screening service routing node 200, and the modified ISUP IAM MSU is then routed to tandem office 706 as message M4. Tandem office 706 receives message M4 and determines the type and outcome of the screening performed by MPP 400 based on the screening identifier. In this example, it is assumed that calling party screening was performed and that the number was screened. Accordingly, tandem office 706 subsequently generates a new ISUP call setup message M5, which is routed via triggerless screening service routing node 200 to EO 704. EO 704 may then instruct IVR node 712 to play an announcement to the caller indicating results of the screening action. Because the message M4 includes the screening type identifier and/or the modified called party number, tandem 706 and end office 704 know the type and results of the screening action and can take appropriate action.

In this example, the attempt by calling party 708 to contact called party 710 is unsuccessful, because the ISUP call setup messages associated with this call attempt are modified by MPP 400. Tandem 706 and/or EO 704 may then direct IVR node 712 to play a message to the caller. The IVR system may notify the calling party that the call has been blocked and the associated reason for the blocking. Because MPP 400 inserts a screening identifier in the IAM message that indicates the type and outcome of the screening performed by MPP 400, there is no need for an originating end office trigger.

Figure 8:
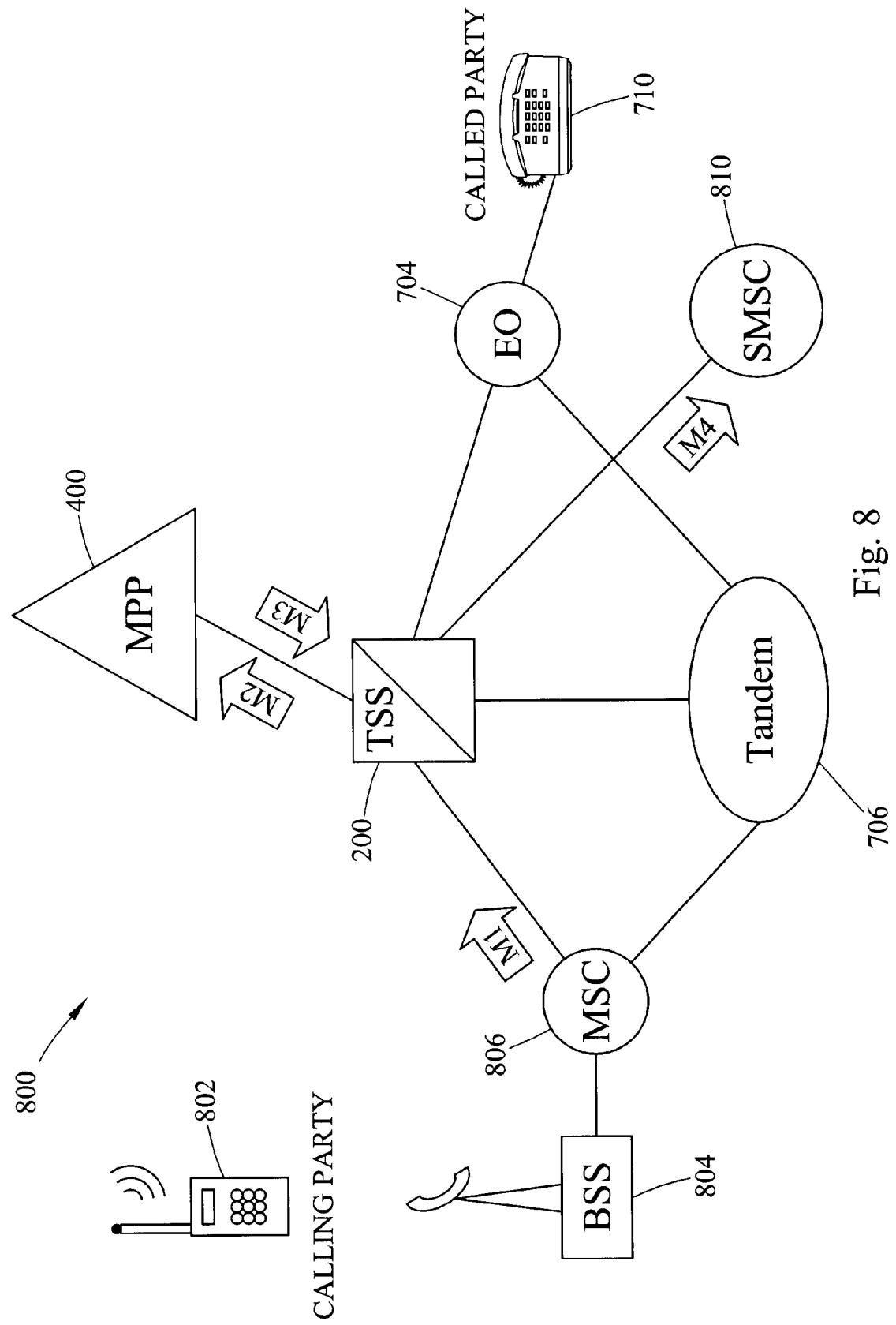
FIG. 8 is a network diagram illustrating signaling message flow associated with a triggerless IN screening system according to an alternate embodiment of the present invention.

The methods and systems described herein for providing triggerless screening services may be applied to screen calls in mobile communications networks. FIG. 8 is a network diagram illustrating a mobile communications network and an example of mobile screening service provided by embodiments of the present invention. In FIG. 8, a mobile communications network 800 handles calls from a wireless or mobile subscriber 802. As such, network 800 includes a base station system (BSS) 804 and a corresponding mobile switching center (MSC) node 806. A BSS essentially provides the air-interface in wireless communication networks. An MSC provides basic switching functionality and coordinates the establishment of calls between wireless end users. An MSC is directly responsible for transmission facilities management, mobility management, and call processing functions. An MSC is typically in communication with the air-interface components of a wireless network (i.e., base station systems) as well as with other voice and signaling related nodes in the wireless network. As such, an MSC includes switching functions, mobile application functions, and other service logic functions in a wireless communications network.

Network 800 also includes a short message service center (SMSC) 810. Short message service center 810 serves as a store and forward center for short message traffic in the network. As such, a call attempt to the called party 710 that is made by mobile calling party 802 results in the generation of an ISUP initial address message (IAM) M1 by the serving or originating MSC 806. This call setup message is received and processed by triggerless screening service routing node 200 in a manner that is similar to that described with regard to FIG. 7. Consequently, the message is encapsulated and diverted to MPP node 400 for IN service processing as message M2. In this case, CallingParty service processing at MPP node 400 results in additional step of generating a short message service (SMS) message M3 that is subsequently TALI-encapsulated and transmitted back to triggerless screening service routing node 200. Triggerless screening service routing node 200 receives the encapsulated message and routes the SMS message to the SMSC node 810 as message M4.

SMSC node 810 receives SMS message M4 and delivers the message to calling party 802. Again, it will be appreciated that such an SMS message may include a text message that indicates some information associated with the blocking incident to the calling party 802. Because MPP node 400 automatically generates the SMS message indicating the results of the screening action, the calling party is notified of the screening and make other arrangements for contacting called party 710 or contact the owner of MPP 400 to determine the reason for the screening action. This message is particularly useful if the calling party is screened because of failure to pay a bill. Once the calling party pays the bill, the owner of MPP 400 can remove the block and allow calls from the particular party to proceed. Removing the block simply involves modifying one database in MPP 400 versus modifying databases at each end office, as required by prior art trigger-based screening systems. Thus, the present invention reduces the burden on network operators in providing and maintaining screening services.

The methods and systems for providing triggerless IN screening services described herein reduce the need for end office triggers and reduce network traffic. By redirecting call setup messages to a message processing platform, the methods and systems described herein render TCAP-based screening services obsolete. By inserting a screening identifier in a screened ISUP message, the methods and systems described herein communicate call screening information to destination nodes.

It will be understood that various details of the invention may be changed without departing from the scope of the invention. Furthermore, the foregoing description is for the purpose of illustration only, and not for the purpose of limitation —the invention being defined by the claims.

What is claimed is:

1. A system for providing triggerless access to intelligent network services in a communications network, the system comprising:

(a) a triggerless screening service routing node for determining whether received messages require call screening processing and for diverting the messages that require call screening processing from their original destinations; and (b) a message processing platform (MPP) operatively associated with the triggerless screening service routing node for receiving the diverted messages, performing at least one call screening action on each of the diverted messages, modifying each message to indicate results of the call screening action and forwarding each modified message to a destination node.

2. The system of claim 1 wherein the triggerless screening service routing node is adapted to determine whether the received messages require call screening processing based on whether the received messages comprise call setup messages and, in response to determining that a received message is a call setup message, for diverting the call setup message to the message processing platform.

3. The system of claim 1 wherein the triggerless screening service routing node is adapted to determine whether the received messages comprise ISUP messages, and in response to determining that a received message is an ISUP message, for diverting the ISUP message to the message processing platform.

4. The system of claim 1 wherein the triggerless screening service routing node is adapted to determine whether the received messages comprise ISUP IAM messages, and in response to determining that a received message comprises an ISUP IAM message, for diverting the ISUP IAM message to the message processing platform.

5. The system of claim 1 wherein the triggerless screening service routing node is adapted to determine whether the received messages comprise SIP messages, and, in response to determining that a received message is a SIP message, for diverting the SIP message to the message processing platform.

6. The system of claim 1 wherein the triggerless screening service routing node is adapted to determine whether the received messages comprise SIP INVITE messages, and, in response to determining that a received message is an INVITE message, for diverting the INVITE message to the message processing platform.

7. The system of claim 1 wherein the triggerless screening service routing node comprises a signal transfer point.

8. The system of claim 1 wherein the triggerless screening service routing node comprises an SS7/IP gateway.

9. The system of claim 1 wherein the message processing platform includes a service selection manager for determining a type of screening required for each of the diverted messages.

10. The system of claim 1 wherein the message processing platform comprises a screening manager including a plurality of screening modules for performing the call screening actions.

11. The system of claim 10 wherein the screening manager includes a credit limit screening module for screening a call setup message diverted by the triggerless screening service routing node in response to determining that a calling party's credit with a telecommunications service provider exceeds a predetermined limit.

12. The system of claim 10 wherein the screening manager includes a missing caller ID screening module for screening a call setup message diverted by the triggerless screening service routing node that lacks caller identification information in response to determining that a called party does not wish to receive calls that lack caller identification information.

13. The system of claim 10 wherein the screening manager includes a calling party screening module for screening a call setup message diverted by the triggerless screening service routing node in response to determining that the calling party identified by the call setup message is in a predetermined list of calling parties.

14. The system of claim 10 wherein the screening manager includes a redirecting party screening module for screening a call setup message diverted by the triggerless screening service routing node in response to determining that the redirecting party identified by the call setup message is in a predetermined list of redirecting parties.

15. The system of claim 10 wherein the screening manager includes a charged party screening module for screening call setup messages diverted by the triggerless screening service routing node based on the charged party identified by the call setup messages.

16. The system of claim 10 wherein the screening manager includes a called party screening module for screening a call setup message diverted by the triggerless screening service routing node based on a called party identified by the call setup message.

17. The system of claim 10 wherein the screening manager is adapted to determine whether to create a billing record for a call setup message diverted by the triggerless screening service routing node.

18. The system of claim 10 wherein the screening manager is adapted to generate and forward a message to a calling party indicating results of the call screening action.

19. The system of claim 18 wherein the calling party comprises a mobile telecommunications system subscriber and the message comprises a short message service (SMS) message.

20. A method for providing triggerless screening services in a communications network, the method comprising:
(a) receiving a call setup message;
(b) determining whether the call setup message requires call screening processing;
(c) in response to determining that the call setup message requires call screening processing, diverting the call setup message to a message processing platform;
at the message processing platform:
(d) performing at least one screening action on the call setup message;
(e) modifying the call setup message to identify the type and result of the screening action; and
(f) forwarding the call setup message to a destination node.

21. The method of claim 20 wherein receiving a call setup message includes receiving an ISUP IAM message.

22. The method of claim 20 wherein receiving a call setup message includes receiving a SIP INVITE message.

23. The method of claim 20 wherein receiving a call setup message includes receiving a call setup message from an end office.

24. The method of claim 20 wherein receiving a call setup message includes receiving a call setup message from a mobile switching center.

25. The method of claim 20 wherein determining whether the message requires call screening processing includes examining a message type of the call setup message.

26. The method of claim 20 wherein diverting the call setup message to the message processing platform includes encapsulating the call setup message in an IP packet and forwarding the IP packet to the message processing platform.

27. The method of claim 20 wherein performing at least one screening action on the call setup message includes performing credit limit screening on the call setup message.

28. The method of claim 20 wherein performing at least one screening action on the call setup message includes performing missing caller ID screening on the call setup message.

29. The method of claim 20 wherein performing at least one screening action on the call setup message includes performing calling party screening on the call setup message.

30. The method of claim 20 wherein performing at least one screening action on the call setup message includes performing OPC screening on the call setup message.

31. The method of claim 20 wherein performing at least one screening action on the call setup message includes performing charged party screening on the call setup message.

32. The method of claim 20 wherein performing at least one screening action on the call setup message includes performing called party screening on the call setup message.

33. The method of claim 20 wherein modifying the call setup includes modifying the message to include a diversion prefix usable by an end office or a tandem office to redirect the call setup message from its intended destination.

34. The method of claim 20 wherein modifying the call setup message includes inserting the screening identifier in a called party number field of the call setup message.

35. The method of claim 20 wherein the call setup message includes an original called party number modifying the call setup message includes modifying the original called party number in the call setup message.

36. The method of claim 35 comprising storing the original called party number in the call setup message.

37. The method of claim 20 wherein forwarding the call setup message to a destination node comprises forwarding the call setup message to an end office.

38. The method of claim 20 wherein forwarding the call setup message to a destination node includes forwarding the call setup message to a tandem office.

39. The method of claim 20 further comprising generating a billing record based on the call setup message.

40. The method of claim 20 further comprising generating a short message service message indicating results of the screening action.

41. A method for providing triggerless screening services in a communications network, the method comprising:
(a) receiving a call setup message;
(b) identifying the call setup message as an ISUP message and, in response, forwarding the ISUP message to a database;
(c) performing a lookup in the database based on one or more parameters in the call setup message to identify a screening service required for the call setup message;
(d) performing the screening action on the call setup message;
(e) modifying the call setup message to include results of the screening action; and
(f) forwarding the call setup message to a destination node.

42. The method of claim 41 wherein receiving a call setup message includes receiving a call setup message at a signal transfer point.

43. The method of claim 41 wherein receiving a call setup message includes receiving a call setup message at an SS7/IP gateway.

44. The method of claim 41 wherein performing a lookup based on one or more parameters in the call setup message includes performing a lookup based on a carrier ID in the call setup message.

45. The method of claim 41 wherein performing a screening action includes performing at least one of: credit limit screening, missing caller ID screening, OPC screening, calling party screening, redirecting party screening, charged party screening, and called party screening.

46. The method of claim 41 wherein forwarding the call setup message to a destination node includes forwarding the call setup message to an end office and wherein the end office uses the results of the screening action to instruct an interactive voice response (IVR) node to play a message to the calling party.

47. The method of claim 41 comprising generating a short message service message indicating results of the screening action.

* * * * *